United States Patent
Malhotra et al.

(10) Patent No.: US 8,273,139 B2
(45) Date of Patent: Sep. 25, 2012

(54) CATALYTIC PARTIAL OXIDATION REFORMING

(75) Inventors: Avinash Malhotra, Houston, TX (US); David P. Mann, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 12/175,639

(22) Filed: Jul. 18, 2008

(65) Prior Publication Data
US 2009/0064582 A1 Mar. 12, 2009

Related U.S. Application Data

(60) Continuation-in-part of application No. 11/526,152, filed on Sep. 22, 2006, now abandoned, which is a division of application No. 10/708,606, filed on Mar. 15, 2004, now Pat. No. 7,138,001.

(60) Provisional application No. 60/320,011, filed on Mar. 16, 2003.

(51) Int. Cl.
C01B 3/24 (2006.01)
(52) U.S. Cl. .................................................. 48/127.1
(58) Field of Classification Search ................. 48/127.1
See application file for complete search history.

(56) References Cited

U.S. PATENT DOCUMENTS

| | | | |
|---|---|---|---|
| 2,896,927 A | 7/1959 | Nagle et al. | |
| 3,920,717 A | 11/1975 | Marion | |
| 3,929,429 A | 12/1975 | Crouch | |
| 4,081,253 A | 3/1978 | Marion | |
| 5,011,625 A | 4/1991 | Le Blanc | |
| 5,122,299 A | 6/1992 | LeBlanc | |
| 5,358,696 A | 10/1994 | Jahnke | |
| 5,362,454 A | 11/1994 | Cizmer et al. | |
| 5,486,313 A | 1/1996 | De Jong et al. | |
| 5,496,859 A | 3/1996 | Fong et al. | |
| 5,720,901 A | 2/1998 | De Jong et al. | |
| 6,005,011 A | 12/1999 | Henningsen | |
| 6,726,850 B1 | 4/2004 | Reyes et al. | |
| 6,730,285 B2 | 5/2004 | Aasberg-Petersen et al. | |
| 6,894,080 B2 | 5/2005 | Seiki et al. | |
| 6,958,363 B2 | 10/2005 | Espinoza et al. | |
| 7,125,913 B2 | 10/2006 | Pan et al. | |
| 7,138,001 B2 | 11/2006 | Knez et al. | |
| 7,144,923 B2 | 12/2006 | Fitzpatrick | |
| 7,226,548 B2 | 6/2007 | Xie et al. | |

(Continued)

FOREIGN PATENT DOCUMENTS

DE 3521304 12/1986
(Continued)

*Primary Examiner* — Imran Akram
(74) *Attorney, Agent, or Firm* — KBR IP Legal Dept.

(57) ABSTRACT

Systems and processes for producing syngas are provided. A first hydrocarbon can be partially oxidized in the presence of an oxidant and one or more first catalysts at conditions sufficient to partially combust a portion of the first hydrocarbon to provide carbon dioxide, non-combusted first hydrocarbon, and heat. At least a portion of the non-combusted first hydrocarbon can be reformed in the presence of at least a portion of the heat generated in the partial oxidation step and the one or more first catalysts to provide a first syngas. The first syngas can comprise hydrogen, carbon monoxide, and carbon dioxide. Heat can be indirectly exchanged from the first syngas to a second hydrocarbon to reform at least a portion of the second hydrocarbon in the presence of steam and one or more second catalysts to provide a second syngas. The second syngas can comprise hydrogen, carbon monoxide, and carbon dioxide.

26 Claims, 7 Drawing Sheets

U.S. PATENT DOCUMENTS

| | | |
|---|---|---|
| 7,261,751 B2 | 8/2007 | Dutta et al. |
| 2001/0018141 A1* | 8/2001 | Kobayashi ............... 429/20 |
| 2003/0162846 A1 | 8/2003 | Wang et al. |
| 2004/0047800 A1* | 3/2004 | Sennoun et al. ........... 423/652 |
| 2004/0182002 A1 | 9/2004 | Malhotra |
| 2006/0128818 A1 | 6/2006 | Wang et al. |
| 2007/0004809 A1 | 1/2007 | Lattner et al. |
| 2007/0129450 A1 | 6/2007 | Barnicki et al. |
| 2007/0217989 A1 | 9/2007 | Malhotra et al. |
| 2007/0289214 A1* | 12/2007 | Briesch et al. ............... 48/61 |
| 2008/0047197 A1 | 2/2008 | Knez |

FOREIGN PATENT DOCUMENTS

| | | |
|---|---|---|
| EP | 168892 | 1/1986 |
| EP | 1277698 | 1/2003 |
| GB | 944059 | 12/1963 |
| WO | 03070629 | 8/2003 |
| WO | 2004041716 | 5/2004 |

* cited by examiner

CATALYTIC PARTIAL OXIDATION REFORMING

CROSS REFERENCE TO RELATED APPLICATION

This application is a continuation-in-part of U.S. Ser. No. 11/526,152 filed on Sep. 22, 2006 now abandoned, which is a divisional of Ser. No. 10/708,606 filed on Mar. 15, 2004, and issued as U.S. Pat. No. 7,138,001, which claims the benefit of provisional application U.S. Ser. No. 60/320,011, filed on Mar. 16, 2003; all of which are incorporated by reference herein.

BACKGROUND

1. Field

The present embodiments generally relate to systems and processes for producing synthesis gas and products made therefrom. More particularly, present embodiments relate to systems and processes for producing syngas and products made therefrom by partial oxidation techniques.

2. Description of the Related Art

Partial oxidation ("POX") systems typically convert preheated hydrocarbon gas and oxidant at very high temperatures, e.g. from about 1,000° C. (1,832° F.) to about 1,300° C. (2,372° F.), to a syngas containing hydrogen, carbon monoxide, carbon dioxide, and water. The hot syngas must then be quenched or cooled, typically to about 200-300° C. (392-572° F.) prior to further processing.

Typically, the syngas is used as a rather expensive heat transfer medium to generate steam. However, the steam production can be far in excess of process requirements and is therefore exported or simply wasted because there is no use for the steam. In other words, cooling the syngas means that much of the heat of reaction is lost or wasted.

Maximizing or increasing the hydrogen and carbon monoxide production in an existing plant is desirable. However, the POX reactor is frequently a capacity-limiting operation because POX reactors cannot be easily expanded to increase production. There is a need, therefore, for more energy efficient systems and processes for producing syngas.

BRIEF DESCRIPTION OF DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to, these embodiments, versions or examples, which are included to enable a person having ordinary skill in the art to make and use the inventions, when the information in this patent is combined with available information and technology.

Systems and processes for producing syngas and products therefrom are provided. In one or more embodiments, a first hydrocarbon can be partially oxidized in the presence of an oxidant at conditions sufficient to partially combust a portion of the first hydrocarbon to provide carbon dioxide, non-combusted hydrocarbon, and heat. In one or more embodiments, at least a portion of the non-combusted hydrocarbon can be reformed in the presence of at least a portion of the heat generated in the partial oxidation step and one or more first catalysts to provide a first syngas. In one or more embodiments, the first syngas can contain, but is not limited to, hydrogen, carbon monoxide, and carbon dioxide. In one or more embodiments, heat from the first syngas can be indirectly exchanged with a second hydrocarbon to reform at least a portion of the second hydrocarbon in the presence of steam and one or more second catalysts to provide a second syngas. In one or more embodiments, the second syngas can contain, but is not limited to, hydrogen, carbon monoxide, and carbon dioxide.

Figure 1:
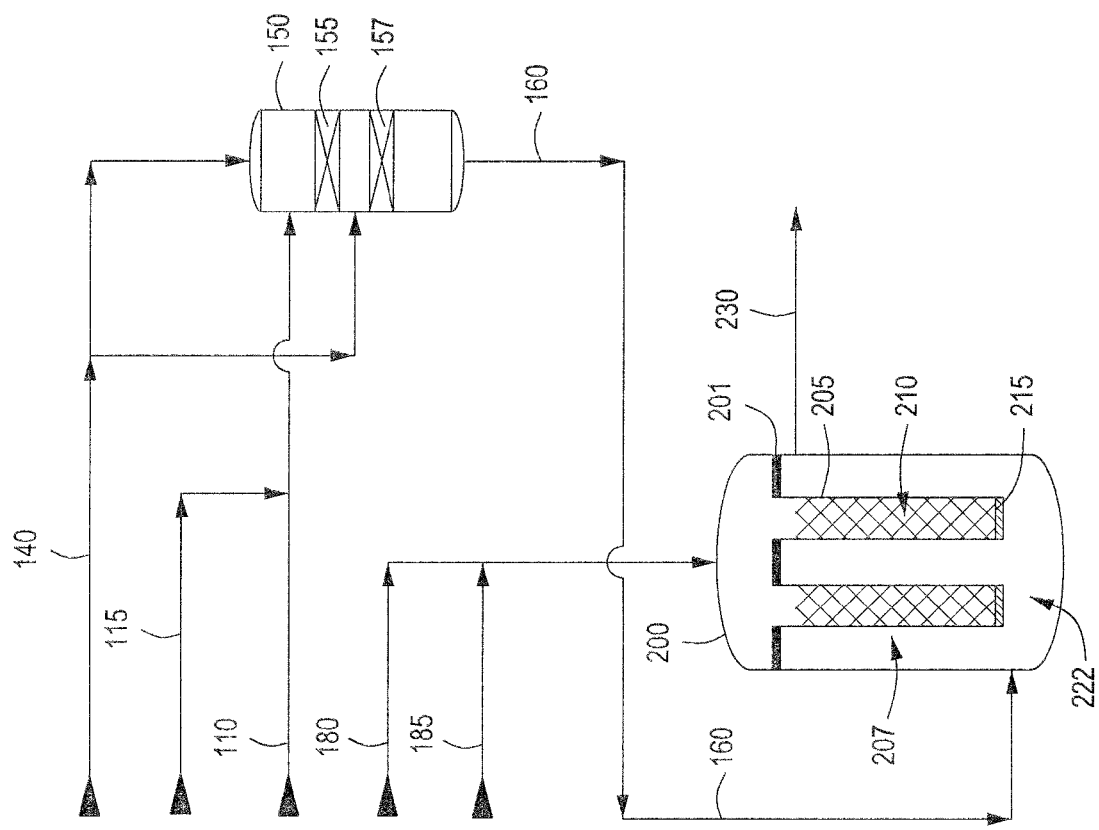
FIG. 1 depicts an illustrative system for producing syngas using partial oxidation techniques, according to one or more embodiments described.

FIG. 1 depicts an illustrative system for producing syngas using partial oxidation techniques, according to one or more embodiments. The system can include one or more catalytic partial oxidation ("CPOX") reactors 150 and one or more reforming exchangers 200. One or more first catalysts can be disposed within the CPOX reactor 150 in one or more first catalyst zones or catalyst beds 155, 157 (two are shown). The one or more first catalyst beds 155, 157 can be, but are not limited to, a fixed bed, fluidized bed, monolith type bed, or any combination thereof. The one or more catalyst beds 155, 157 can be supported by any known method, such as screens, support rods/bars, or other suitable support structures.

At least one of the reforming exchangers 200 can be a shell-and-tube type exchanger. The reforming exchanger 200 can include one or more tubes 205 at least partially disposed within the shell of the reforming exchanger 200. One or more second catalysts can be disposed within the one or more tubes 205 to provide one or more second catalyst zones 210 within the one or more tubes 205. The one or more second catalysts can be supported in the one or more tubes 205 by one or more screens 215 or other suitable support structures.

The one or more tubes 205 can be arranged in any pattern or configuration within the shell of the reforming exchanger 200. Although not shown, the tubes 205 can include, but are not limited to, one or more fins, static mixers, rifling, heat conductive packing, turbulence causing projections, or any combination thereof, disposed on the external surface and/or the internal surface of the tubes 205. The one or more tubes can be of various types, for example, straight tubes, bayonet tubes (not shown), U-tubes (not shown), coiled tubes (not shown), or any combination thereof. In one or more embodiments, two or more tubes 205 can be used which can have the same or different shape, length, and/or diameter or cross-sectional area. The one or more tubes 205 can be disposed in a vertical, horizontal, or any other angle within the reforming exchanger 200.

The tubes 205 can be supported within the shell of the reforming exchanger 200 by one or more tube sheets 201. The one or more tube sheets 201 can separate the shell-side of the reforming exchanger 200 from a first end of the one or more tubes 205 and can prevent fluid communication between the first end of the one or more tubes 205 and the shell-side of the reforming exchanger 200. A second end of the one or more tubes 205 can be in fluid communication with the shell-side of the reforming exchanger 200.

Figure 2:
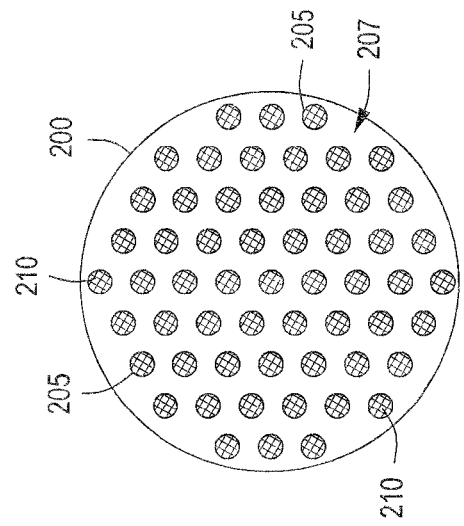
FIG. 2 depicts an illustrative cross-sectional top view of the reforming exchanger having a plurality of tubes, according to one or more embodiments described.

FIG. 2 depicts an illustrative cross-sectional top view of the reforming exchanger having a plurality of tubes, according to one or more embodiments. FIG. 2 depicts one or more second catalyst zones 210 disposed within a plurality of tubes 205. A plurality of tubes is defined as two or more tubes 205. A heating zone 207 defined by the space between or around the one or more tubes 205 (see also FIG. 1) allows heat to be indirectly transferred from a heat transfer medium introduced to the shell-side of the reforming exchanger 200 to the one or more catalyst zones 210.

Referring again to FIG. 1, the one or more first catalysts in the CPOX reactor 150 and/or the one or more second catalysts in the reforming exchanger 200 can include, but are not limited to, alkaline earth metals, rare earth metals, chromium, manganese, molybdenum, tungsten, tin, rhenium, bismuth, indium, phosphorus, iron, cobalt, nickel, ruthenium, rhodium, palladium, osmium, iridium, platinum, oxides thereof, derivatives thereof, mixtures thereof, or combinations thereof. The one or more second catalysts in the reforming exchanger 200 can be the same or different as the one or more first catalysts in the one or more CPOX reactors 150. The one or more first catalysts disposed in the CPOX reactor 150, the one or more second catalysts disposed in the reforming exchanger 200, or both can further include one or more catalyst support materials.

In one or more embodiments, the catalyst support materials can be or can include a refractory oxide. For example, the refractory oxide can be alumina, particularly alpha alumina; zirconia; titania; hafnia; silica; or mixtures thereof. The catalyst support material can be or can include rare earth modified refractory metal oxides, where the rare earth may be any rare earth metal, for example, lanthanum or yttrium; and/or alkali earth metal modified refractory oxides. The catalyst support material can be categorized as materials having a substantially stable surface area at reaction conditions, for example, a surface area that is not substantially altered by reaction conditions or altered in a way that affects the reaction.

The one or more first catalysts and/or second catalysts ("catalysts") can be in the form of granules, powder, beads, pills, pellets, flakes, cylinders, spheres, or other shapes. The catalysts can have a length or size ranging from 50 microns (0.002 in.) to about 1 cm (0.4 in.). In one or more embodiments, the catalysts can have a length or size ranging from about 0.25 mm (0.01 in.) to about 6.5 mm (0.26 in.) or from about 0.5 mm (0.02 in.) to about 0.4 mm (0.16 in.).

Additional reaction conditions, catalysts, and CPOX reactor 150 details can be found in U.S. Pat. Nos. 5,486,313; 5,720,901; 7,226,548; and 7,261,751 all of which are fully incorporated by reference herein. Additional reforming process conditions, catalysts, and reforming exchanger 200 details can be found in U.S. Pat. Nos. 5,011,625; 5,122,299; 5,362,454; 6,855,272; 7,138,001; and 7,220,505 all of which are fully incorporated by reference herein.

A first hydrocarbon via line 110 and an oxidant via line 140 can be introduced to the one or more CPOX reactors 150. The first hydrocarbon can be partially oxidized in the presence of the oxidant and the one or more first catalysts. The partial oxidation can occur at conditions sufficient to partially combust a portion of the first hydrocarbon to provide carbon dioxide, non-combusted hydrocarbon, and heat. The non-combusted hydrocarbon can be at least partially reformed, in the presence of at least a portion of the heat generated in the partial oxidation step and the one or more first catalysts, to provide a first syngas. The first syngas can include, but is not limited to, hydrogen, carbon monoxide, and carbon dioxide. As the partially combusted first hydrocarbon flows through/across the one or more first catalyst zones 155, 157, at least a portion of the non-combusted hydrocarbon can react (i.e. be reformed) to provide the first syngas. In one or more embodiments, the first hydrocarbon via line 110 can be mixed with steam and/or carbon dioxide via line 115 prior to introducing the first hydrocarbon to the one or more CPOX reactors 150. Although not shown, in one or more embodiments, the first hydrocarbon and the oxidant can be mixed upstream of the CPOX reactor 150 to provide a reactant mixture, which can then be introduced to the CPOX reactor 150. Although not shown, in one or more embodiments, steam and/or carbon dioxide via line 115 can be introduced directly to the one or more CPOX reactors 150 or premixed with the oxidant.

The one or more oxidants via line 140 can be introduced to the one or more CPOX reactors 150 before the first of the one or more first catalyst zones 155, 157. In one or more embodiments, a portion of the one or more oxidants via line 140 can be introduced, before each of the one or more first catalyst zones 155, 157, thereby providing inter-catalyst bed oxidant injection. Inter-catalyst bed oxidant injection can provide independent regulation and control of the amount of oxidant introduced via line 140 to each catalyst bed 155, 157. Controlling the amount of oxidant introduced via line 140 to the one or more catalyst beds 155, 157 can improve reaction rate and temperature regulation within the one or more first catalyst zones 155, 157.

The CPOX reactor 150 can be operated at a temperature of from about 700° C. (1,292° F.) to about 1,500° C. (2,732° F.) as measured by the temperature of the first syngas as the first syngas exits the CPOX reactor 150 via line 160. The CPOX reactor 150 can be operated at a temperature of from about 700° C. (1,292° F.), about 800° C. (1,472° F.), or about 900° C. (1,652° F.) to about 1,100° C. (2,012° F.), about 1,200° C. (2,192° F.), or about 1,300° C. (2,372° F.). The CPOX reactor 150 can be operated at a pressure of from about 100 kPa (0 psig) to about 15,000 kPa (2,162 psig), or from about 400 kPa (44 psig) to about 8,500 kPa (1,219 psig).

A second hydrocarbon via line 180 can be introduced to the one or more reforming exchangers 200. The second hydrocarbon can be mixed with steam via line 185. In one or more embodiments, the second hydrocarbon can be mixed with steam and carbon dioxide via line 185. The second hydrocarbon and steam mixture via line 180, with or without carbon dioxide, can be introduced to the one or more second catalyst zones 210. For example, the second hydrocarbon via line 180 can be introduced to the first end of the one or more second catalyst-containing tubes 205. The second hydrocarbon can be at least partially reformed by passing the second hydrocarbon through the one or more second catalyst zones 210 to provide a second syngas. The second syngas can include, but is not limited to, hydrogen, carbon monoxide, and carbon dioxide. The second syngas can exit the second end of the one or more tubes 205 through the screens 215 and can be mixed with the first syngas in mixing zone 222 to provide a mixed syngas or syngas product via line 230.

The first syngas via line 160 can be introduced to the shell-side of the reforming exchanger 200. The first syngas and second syngas can be mixed in a mixing zone 222 to provide a mixed syngas. The heat necessary for reforming the second hydrocarbon in the second catalyst zone 210 can be provided by the mixed syngas as the mixed syngas flows along/across the one or more tubes 205 through the heating zone 207. Although not shown the first syngas can pass across or around the outside of the one or more tubes 205 to indirectly transfer heat from the first syngas to the second catalyst zone 210 after which the first syngas and second syngas can be mixed in the mixing zone 222. The mixed syngas can be recovered as a syngas product ("syngas") via line 230.

The first hydrocarbon via line 110 and the second hydrocarbon via line 180 can include, but are not limited to, one or more carbon containing materials. The carbon containing materials can include, but are not limited to, methane, ethane, propane, butane, pentane, hexane, or any other hydrocarbon containing a total of one (1) to twenty (20) carbon atoms ($C_1$ to $C_{20}$), or any mixture thereof. The carbon containing materials can include, but are not limited to, $C_1$ to $C_5$ hydrocarbons or any mixture thereof. The carbon containing materials can include, but are not limited to, natural gas, methane, de-sulfurized natural gas, de-sulfurized methane, mixtures thereof, or any combination thereof. The first hydrocarbon and the second hydrocarbon can be the same or different carbon containing materials. The first hydrocarbon, the second hydrocarbon, or both can be substantially free of contaminants, such as sulfur, mercury, carbon monosulfide, and other contaminants.

The first hydrocarbon via line 110 and/or the second hydrocarbon via line 180 can contain about 80% mol dry basis methane or more, or about 90% mol dry basis methane or more, or about 95% mol dry basis methane or more, or about 97% mol dry basis methane or more, or about 99% mol dry basis methane or more. The term "dry basis," as used herein, refers to a feed, product, syngas, or intermediate without water and/or nitrogen.

The first hydrocarbon via line 110 can range from about 10% wt to 90% wt of the total combined first hydrocarbon and second hydrocarbon ("total feed"). The first hydrocarbon can range from about 20% wt to about 80% wt of the total feed or from about 30% wt to about 70% wt of the total feed, or from about 40% wt to about 60% wt of the total feed. The second hydrocarbon via line 180 can range from about 10% wt to about 90% wt of the total feed. The second hydrocarbon can range from about 20% wt to about 80% wt of the total feed, or from about 30% wt to about 70% wt of the total feed, or from about 40% wt to about 60% wt of the total feed.

The types and amounts of the one or more oxidants introduced via line 140 to the one or more CPOX reactors 150 can influence the composition and physical properties of the first syngas via line 160 and the syngas via line 230. The one or more oxidants can include but are not limited to, air, oxygen, essentially oxygen, oxygen-enriched air, mixtures of oxygen and air, water, carbon dioxide, mixtures of oxygen and inert gas such as nitrogen and argon, nitrogen enriched air, and any mixture thereof. The oxidant can contain about 60% vol oxygen or more, or about 70% vol oxygen or more, or about 80% vol oxygen or more, or about 90% vol oxygen or more, or about 95% vol oxygen or more, or about 99% vol oxygen or more. As used herein, the term "essentially oxygen" refers to an oxidant containing more than 50% vol oxygen. As used herein, the term "oxygen-enriched air" refers to an oxidant stream containing more than 21% vol oxygen. Oxygen, essentially oxygen, or oxygen-enriched air can be obtained, for example, from cryogenic distillation, pressure swing adsorption, membrane separation, or any combination thereof. The one or more oxidants via line 140 can be nitrogen-free or essentially nitrogen-free. As used herein, the term "essentially nitrogen-free," refers to an oxidant stream containing about 5% vol nitrogen or less, 4% vol nitrogen or less, 3% vol nitrogen or less, 2% vol nitrogen or less, or 1% vol nitrogen or less.

The catalytic partial oxidation reaction that can occur in the CPOX reactor 150 can be promoted (i.e. controlled) by optimizing the concentrations of the one or more carbon containing materials and molecular oxygen ($O_2$) introduced via line 140. The first hydrocarbon and oxidant can be adjusted to have, for example, a molar carbon:$O_2$ ratio (C:$O_2$) in the range of from about 1:1 C:$O_2$ to about 10:1 C:$O_2$, or from about 1:1 C:$O_2$ to about 8:1 C:$O_2$, or from about 1:1 C:$O_2$ to about 6:1 C:$O_2$. The molar C:$O_2$ ratio can be in the range of from about 1.5:1 C:$O_2$ to about 4:1 C:$O_2$, or from about 1.6:1 C:$O_2$ to about 3.5:1 C:$O_2$, or from about 1.6:1 C:$O_2$ to about 2.5:1 C:$O_2$.

In one or more embodiments, steam and/or carbon dioxide can be present in the first hydrocarbon in line 110. Steam and/or carbon dioxide can be introduced directly to the CPOX reactor 150 and/or the first hydrocarbon in line 110. The weight ratio of steam to carbon of the first hydrocarbon via line 110 initially in contact with the first catalyst zone 155 can be from about 0 to about 3 and the weight ratio of carbon dioxide to carbon of the first hydrocarbon initially in contact with the first catalyst zone 155 can be from about 0 to about 2.

The one or more oxidants introduced via line 140 to the CPOX reactor 150 can be selected to provide the first syngas via line 160, the second syngas exiting the one or more tubes 205, and/or the syngas product via line 230 that can contain about 30% mol dry basis hydrogen or more, or about 40% mol dry basis hydrogen or more, or about 50% mol dry basis hydrogen or more, or about 60% mol dry basis hydrogen or more, or about 70% mol dry basis hydrogen or more. The oxidant via line 140 can be selected to provide the first syngas via line 160, the second syngas exiting the one or more tubes 205, and/or the syngas product via line 230 that can contain about 5% mol dry basis carbon monoxide or more, or about 10% mol dry basis carbon monoxide or more, or about 15% mol dry basis carbon monoxide or more, or about 20% mol dry basis carbon monoxide or more, or about 25% mol dry basis carbon monoxide or more, or about 30% mol dry basis carbon monoxide or more, or about 35% mol dry basis carbon monoxide or more. The oxidant via line 140 can be selected to provide the first syngas via line 160 and/or the syngas product via line 230 that can contain about 2% mol dry basis carbon dioxide or more, or 5% mol dry basis carbon dioxide or more, or about 10% mol dry basis carbon dioxide or more, or about 20% mol dry basis carbon dioxide or more.

The concentration of hydrogen in the first syngas via line 160, second syngas, and/or syngas product via line 230 can range from a low of about 30% mol dry basis, 40% mol dry basis, or 50% mol dry basis to a high of about 50% mol dry basis, 60% mol dry basis, or 70% mol dry basis. The hydrogen concentration in the first syngas via line 160, second syngas, and/or the syngas product via line 230 can range from a low of about 25% mol dry basis, 35% mol dry basis, or 45% mol dry basis to a high of about 55% mol dry basis, or 65% mol dry basis. The carbon monoxide concentration in the first syngas via line 160, second syngas, and/or the syngas product via line 230 can range from a low of about 5% mol dry basis, 10% mol dry basis, 15% mol dry basis, or 20% mol dry basis to a high of about 25% mol dry basis, 30% mol dry basis, or 35% mol dry basis. The carbon dioxide concentration in the first syngas via line 160, second syngas, and/or the syngas product via line 230 can range from a low of about 2% mol dry basis, 5% mol dry basis, or 7% mol dry basis, to a high of about 10% mol dry basis, 15% mol dry basis, or 25% mol dry basis.

The compositions of the first syngas via line 160, second syngas exiting the one or more tubes 205, and/or the second syngas product via line 230 can have different concentrations of hydrogen, carbon monoxide, and carbon dioxide. For example, the first syngas via line 160 can have a hydrogen concentration of about 60% mol dry basis and the syngas product via line 230 can have a hydrogen concentration of about 70% mol dry basis. The concentrations of hydrogen, carbon monoxide, and carbon dioxide in the first syngas via line 160 and the syngas product via line 230 can vary over time. Several factors can affect the concentrations of the first syngas via line 160 and the syngas product via line 230, which can include, but are not limited to flow rates, hydrocarbon feed composition, temperatures, pressures, catalyst type, catalyst age, and oxidant.

The composition of the syngas product via line 230 can be about 65% mol dry basis hydrogen, about 30% mol dry basis carbon monoxide, and about 4% mol dry basis carbon dioxide. The composition of the syngas product via line 230 can be about 65% mol dry basis hydrogen, about 15% mol dry basis carbon monoxide, and about 15% mol dry basis carbon dioxide.

Figure 3:
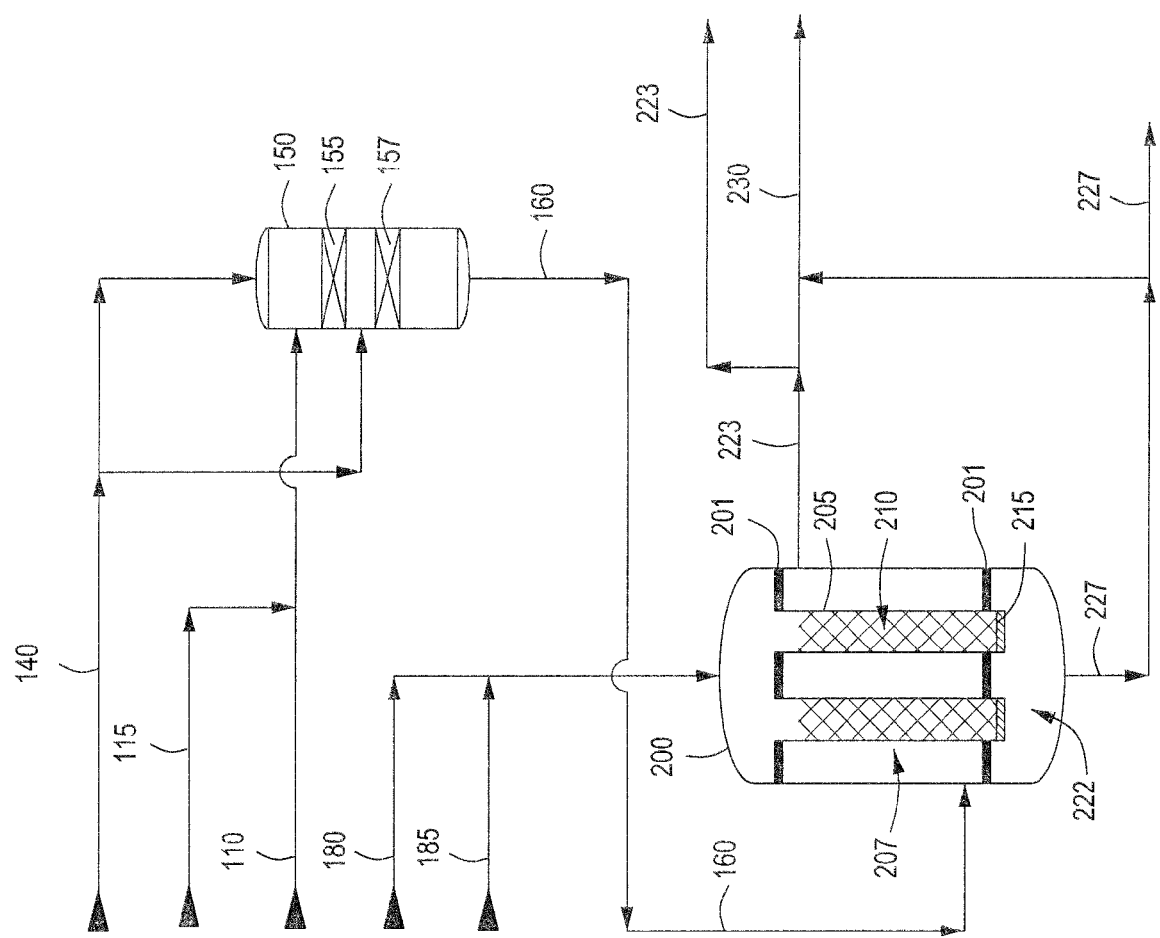
FIG. 3 depicts another illustrative system for producing syngas using partial oxidation techniques, according to one or more embodiments described.

FIG. 3 depicts another illustrative system for producing syngas using partial oxidation techniques, according to one or more embodiments. The one or more CPOX reactors 150, first hydrocarbon via line 110, oxidant via line 140, first syngas via line 160, second hydrocarbon via line 180, and syngas product via line 230 can be as discussed and described above with reference to FIG. 1. The one or more reforming exchangers 200 can be as discussed and described above with reference to FIG. 1, however, the internal configuration of the shell-and-tube type exchanger can be different. In one or more embodiments, the one or more catalyst-containing tubes 205 can have two or more tube sheets 201 (two are shown) disposed about the tubes 205. The one or more catalyst-containing tubes 205 can have at least one tube sheet disposed at or near the first end of the tubes 205 and at least one tube sheet disposed at or near the second end of the tubes 205 in such a manner that at least a portion of the second catalyst zone 210 can be positioned between the two tube sheets 201. In this embodiment, both ends of the catalyst-containing tubes 205 can be separated from (i.e. not in fluid communication with) the shell-side of the reforming exchanger 200.

The second hydrocarbon via line 180 can be introduced to the first end of the one or more tubes 205. The second hydrocarbon can be reformed in the second catalyst zone 210 within the one or more tubes 205. The tubes 205 can extend through the heating zone 207, which can be defined by the space or volume between the two or more tube sheets 201. The heat for the endothermic reforming reaction of the second hydrocarbon via line 180 can be provided by the heat from the first syngas introduced via line 160 to the heating zone 207. Rather than mixing the first syngas and the second syngas to provide a syngas product, as shown in FIG. 1, the first syngas can be recovered via line 223 and the second syngas can be recovered via line 227. In one or more embodiments, at least a portion of the first syngas via line 223 and at least a portion of the syngas via line 227 can be mixed to provide the syngas product via line 230. The first syngas via line 223, second syngas via line 227, or a mixture thereof (i.e. syngas product) via line 230 can contain, but are not limited to, hydrogen, carbon monoxide, and carbon dioxide.

Although not shown, in one or more embodiments, three or more tube sheets 201 can be installed to provide two or more heating zones 207 within the reforming exchanger 200. For example, three tube sheets 201 (two are shown) can be installed with the first tube sheet 201 disposed at or near a first end of the one or more tubes 205, the second tube sheet 201 disposed at or near the second end of the one or more tubes 205, and the third tube sheet (not shown) can be disposed between the first tube sheet 201 and second tube sheet 201 to provide two independent heating zones. In one or more embodiments, the first syngas via line 160 can be split and at least a portion of the first syngas via line 160 can be introduced to each independent heating zone. In one or more embodiments, the first syngas via line 160 can be introduced to one of the independent heating zones and a second heat transfer medium, such as steam, can be introduced to the other independent heating zone. This arrangement can improve temperature control within the multiple reaction zones as the amount of heat introduced to a particular heating zone from the first syngas via line 160 can be independently controlled by controlling the amount of the first syngas (or other heat transfer medium) introduced to the two or more heating zones.

Figure 4:
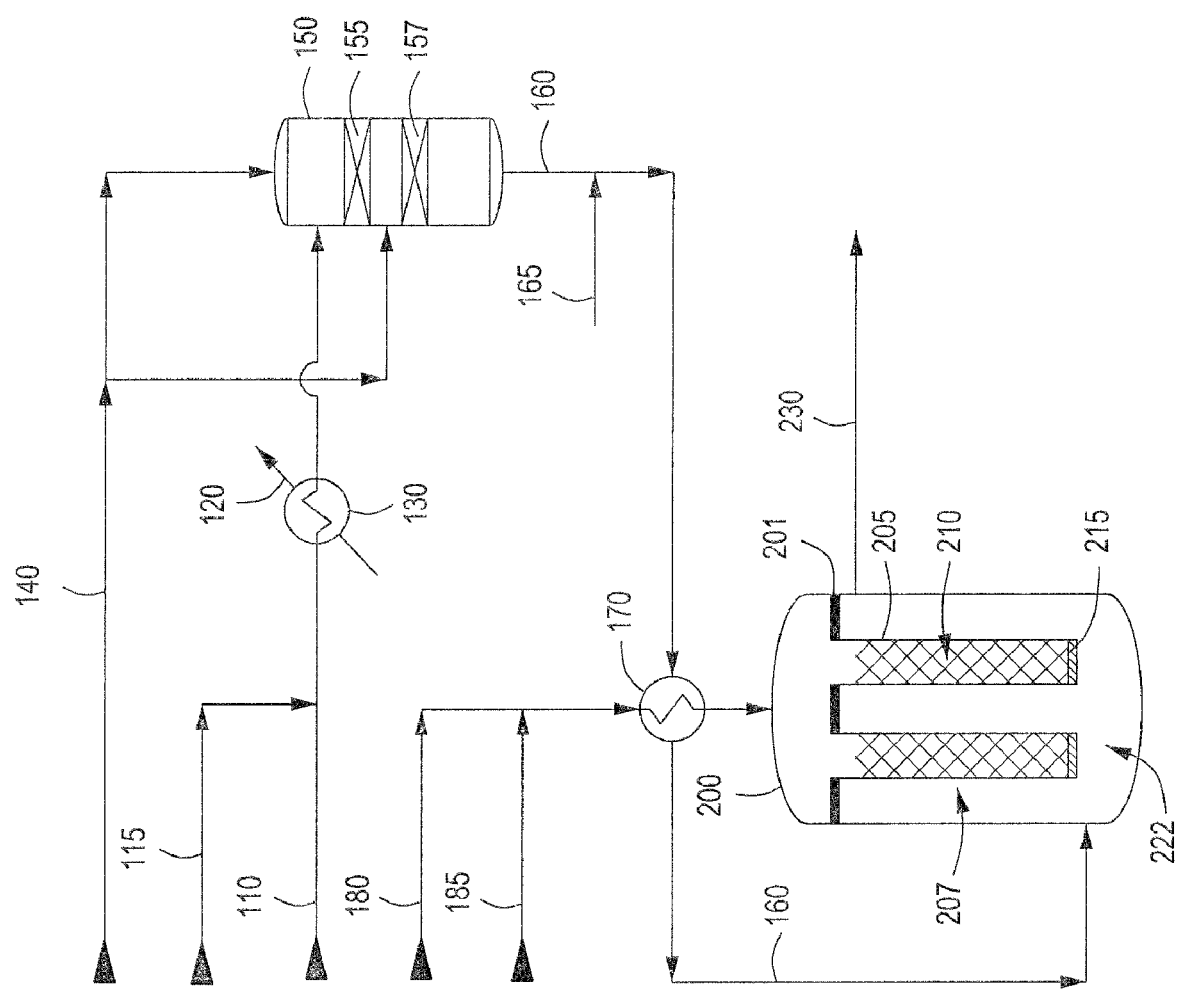
FIG. 4 depicts another illustrative system for producing syngas using partial oxidation techniques, according to one or more embodiments described.

FIG. 4 depicts another illustrative system for producing syngas using partial oxidation techniques, according to one or more embodiments. The one or more CPOX reactors 150, one or more reforming exchangers 200, first hydrocarbon via line 110, oxidant via line 140, first syngas via line 160, second hydrocarbon via line 180, second syngas, and syngas product via line 230 can be as discussed and described above with reference to FIGS. 1-3. In one or more embodiments, the system can further include one or more heat exchangers (two are shown 130, 170). The heat exchangers can be used to preheat the first hydrocarbon via line 110, second hydrocarbon via line 180 and/or to cool the first syngas via line 160.

The first hydrocarbon in line 110 can be preheated in one or more heat exchangers 130 by a heat transfer medium, such as steam, supplied via line 120. The first hydrocarbon in line 110 can be preheated to a temperature of from about 100° C. (212° F.) to about 900° C. (1,652° F.), or from about 100° C. (212° F.) to about 700° C. (1,292° F.), or from about 300° C. (572° F.) to about 500° C. (932° F.). For example, the first hydrocarbon in line 110 can be preheated to a temperature of about 400° C. (752° F.), about 500° C. (932° F.), or about 600° C. (1,112° F.).

The second hydrocarbon in line 180 can be preheated in one or more heat exchangers 170 using the first syngas in line 160 as a heat transfer medium. In one or more embodiments, the second hydrocarbon in line 180 can be preheated in heat exchanger 170 by transferring heat to the second hydrocarbon in line 180 from an externally supplied heat transfer medium, such as steam. The second hydrocarbon via line 180 can be preheated to a temperature of from about 100° C. (212° F.) to about 900° C. (1,652° F.), or from about 300° C. (212° F.) to about 700° C. (1,292° F.), or from about 450° C. (842° F.) to about 650° C. (1,202° F.). For example, the second hydrocarbon in line 180 can be preheated to a temperature of about 400° C. (752° F.), about 500° C. (932° F.), or about 600° C. (1,112° F.).

In one or more embodiments, the first syngas in line 160 can be cooled between the CPOX reactor 150 and the reforming exchanger 200. The first syngas in line 160 can be cooled by indirect cooling, direct cooling, or both. The first syngas in line 160 can be cooled, for example, by direct cooling with water, carbon dioxide, or any other suitable cooling medium introduced via line 165. The first syngas in line 160 can be cooled by non-contact cooling, for example, by indirectly transferring heat with a heat transfer medium in one or more heat exchangers, for example heat exchanger 170. Any suitable heat transfer mediums can be used in the heat exchanger 170, for example, the second hydrocarbon via line 180, water (not shown), another process feed from within the plant (not shown), mixtures thereof, or combinations thereof. The first syngas via line 160 can be cooled to temperature of from about 700° C. (1,292° F.) to about 1,100° C. (2,012° F.) or from about 750° C. (1,382° F.) to about 1,000° C. (1,832° F.).

The temperature of the first syngas introduced via line 160 to the reforming exchanger 200 can be about 10% to about 300% greater than the temperature of the second hydrocarbon introduced via line 180 to the reforming exchanger 200. The temperature of the first syngas introduced via line 160 to the reforming exchanger 200 can be about 30% greater, about 40% greater, about 50% greater, about 60% greater, or about 70% greater or more than the temperature of the second hydrocarbon introduced via line 180 to the reforming exchanger 200.

Although not shown, in one or more embodiments the oxidant introduced via line 140 to the CPOX reactor 150 can be preheated in one or more heat exchangers or mixed with the first hydrocarbon and heated in heat exchanger 130. The oxidant can be preheated to a temperature of from about 100° C. (212° F.) to about 900° C. (1,652° F.), or from about 100° C. (212° F.) to about 700° C. (1,292° F.), or from about 300° C. (572° F.) to about 500° C. (932° F.).

Figure 5:
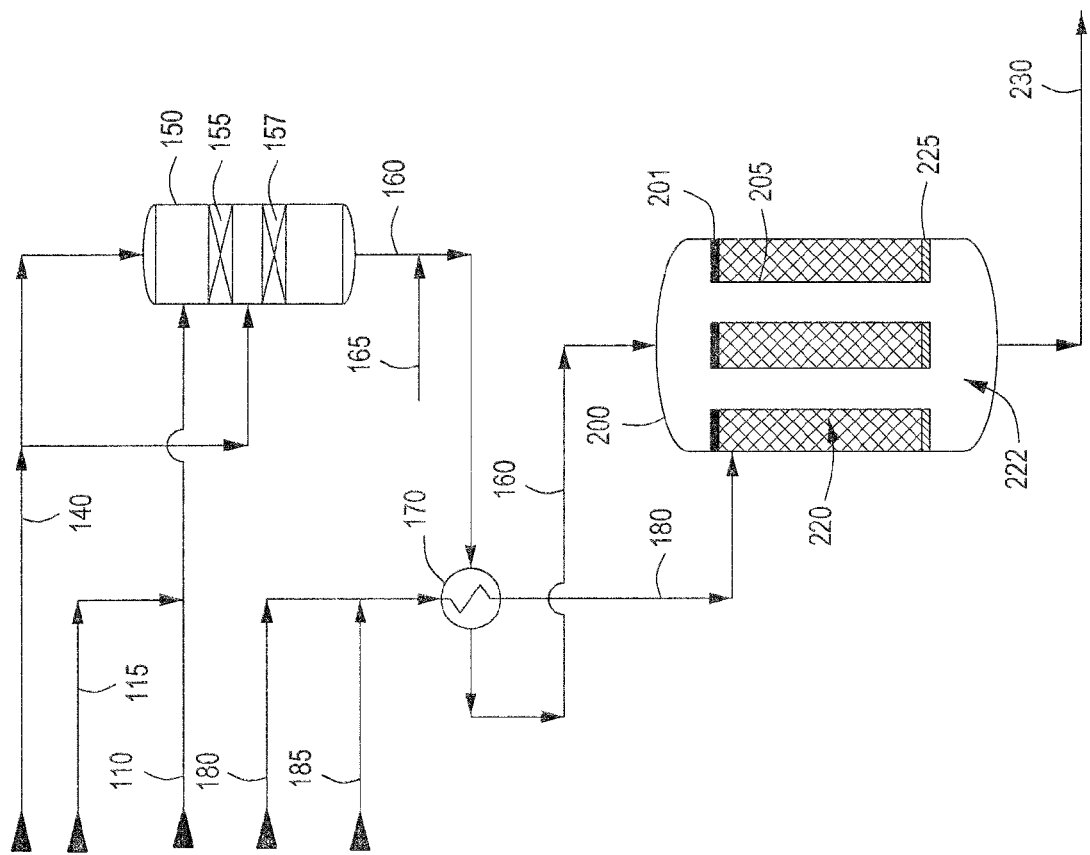
FIG. 5 depicts yet another illustrative system for producing syngas using partial oxidation techniques, according to one or more embodiments described.

FIG. 5 depicts yet another illustrative system for producing syngas using partial oxidation techniques, according to one or more embodiments. The one or more CPOX reactors 150, first hydrocarbon via line 110, oxidant via line 140, second hydrocarbon via line 180, first syngas via line 160, second syngas, and syngas product via line 230 can be as discussed and described above with reference to FIGS. 1-4. The one or more reforming exchangers 200 can be as discussed and described above with reference to FIG. 1, however, the internal configuration of the shell-and-tube type exchanger can be different. In one or more embodiments, the one or more second catalysts can be disposed within at least a portion of the shell-side of the reforming exchanger 200 to provide one or more second catalyst zones 220. The one or more second catalysts in the second catalyst zone 220 can be supported by a catalyst screen 225, or any other suitable support structure to provide a mixing zone 222 adjacent the second end of the one or more tubes 205. In one or more embodiments, the second catalyst can be placed within the shell-side of the reforming exchanger without a catalyst screen 225, wherein the mixing zone 222 can contain a portion of the second catalyst.

Figure 6:
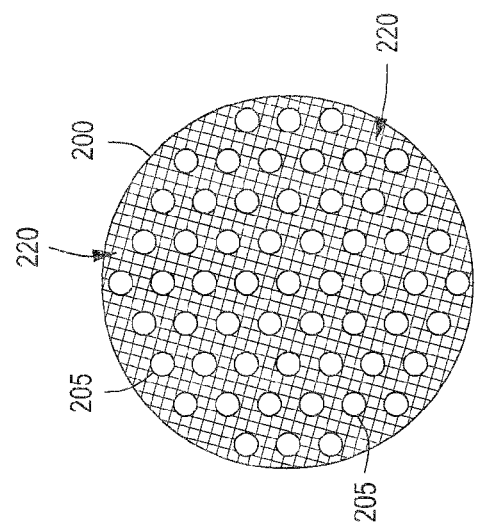
FIG. 6 depicts an illustrative cross-sectional top view of the reforming exchanger having a plurality of tubes, according to one or more embodiments described.

FIG. 6 depicts an illustrative cross-sectional top view of the reforming exchanger having a plurality of tubes, according to one or more embodiments described. FIG. 6 depicts the second catalyst zone 220 disposed within at least a portion of the shell-side of the reforming exchanger 200. The second catalyst zone 220 can be disposed about the one or more catalyst free tubes 205. Heat can be indirectly transferred from a heat transfer medium which can flow through the tubes 205 to the second catalyst zone 220.

Referring again to FIG. 5, the first syngas via line 160 can be introduced to the tube-side of the reforming exchanger 200. The first syngas via line 160 can flow through the one or more tubes 205. The second hydrocarbon can be introduced via line 180 to the shell-side of the reforming exchanger 200, which can flow through and/or across the second catalyst zone 220, wherein the second hydrocarbon can be reformed to provide the second syngas which can be introduced to the mixing zone 222 through catalyst screens 225. The heat necessary for reforming the second hydrocarbon can be indirectly transferred from the first syngas flowing through the one or more tubes 205 to the second catalyst zone 220.

Although not shown in one or more embodiments, the first syngas and second syngas can be mixed outside the reforming exchanger 200 as discussed and described with reference to FIG. 3. In one or more embodiments, the first syngas and the second syngas can be independently recovered (i.e. no mixing) from the reforming exchanger 200. For example, the catalyst screen 225 can be replaced by a second tube sheet 201, which can provide separate and independent flow paths for the first syngas and the second syngas. The second syngas can be recovered from an exit line in fluid communication with the shell-side of the reforming exchanger 200 and the first syngas can be recovered from an exit line in fluid communication with the tube side of the reforming exchanger.

Although not shown, in one or more embodiments, the first syngas introduced via line 160 can be apportioned differently to different areas throughout the catalyst zone. For example, two or more sets of independently supplied tubes disposed within and/or through the second catalyst zone 220 can be introduced with varying amounts of the first syngas via line 160. For example, 70% of the first syngas via line 160 can be introduced to a first set of tubes and 30% can be introduced to a second set of tubes, which can provide more heat in a first portion of the catalyst zone 220 wherein more unreacted second hydrocarbon via line 180 can be present. The two or more sets of independently supplied tubes disposed within and/or through the second catalyst zone 220 can be straight, U-form, spiral wound, and/or bayonet type tubes.

Although not shown, in one or more embodiments, the first syngas via line 160 can be introduced at either end of the one or more tubes 205 and/or anywhere along the length of the one or more tubes 205. For example, the first syngas via line 160 can be introduced directly to the mixing zone 222, and the mixed syngas can flow through the one or more tubes 205.

Figure 7:
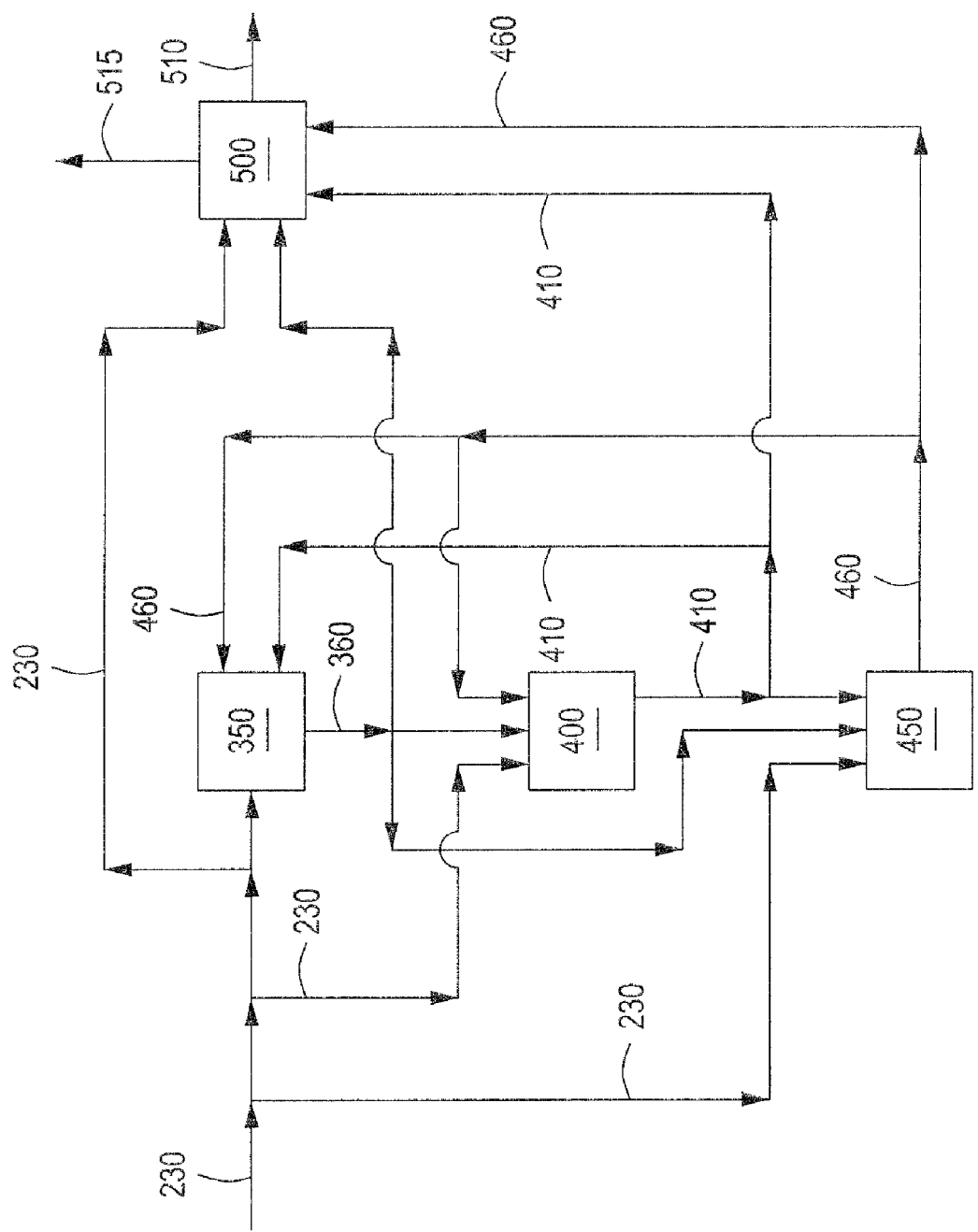
FIG. 7 depicts an illustrative system for producing syngas and one or more hydrogen containing products therefrom, according to one or more embodiments described.

FIG. 7 depicts an illustrative system for producing syngas and one or more hydrogen containing products therefrom, according to one or more embodiments. The syngas product via line 230 can be produced using the one or more embodiments discussed and described above with reference to FIGS. 1-6. The system can further include one or more high temperature shift converters ("HTSC") 350, one or more medium temperature shift converters ("MTSC") 400, one or more low temperature shift converters ("LTSC") 450, and/or one or more separation systems 500. At least a portion of the syngas via line 230 can be introduced to the one or more HTSCs 350, MTSCs 400, LTSC 450, and/or separation systems 500. Although not shown, in one or more embodiments, the syngas can be as discussed and described above with reference to FIG. 3. For example, the syngas product via line 230 can be a syngas product via line 223, a syngas product via line 227, a syngas product via line 230, or combinations thereof. (i.e. the first syngas and/or the second syngas can be independently processed without mixing or mixing only a portion of each to provide the syngas via line 230).

Referring again to FIG. 7, the HTSC 350, MTSC 400, and LTSC 450 can contain one or more catalysts. The HTSC 350, MTSC 400, and LTSC 450 can convert carbon monoxide in the syngas in line 230 to carbon dioxide by reacting the carbon monoxide in the presence of the catalyst, disposed in the HTSC 350, MTSC 400, and/or LTSC 450, at a temperature sufficient to oxidize the carbon monoxide. The catalyst disposed in the HTSC 350 can include, but is not limited to, iron oxide, zinc ferrite, magnetite, chromium oxides, derivatives thereof or any combination thereof. The HTSC 350 can be operated at a temperature of from about 325° C. (617° F.) to about 550° C. (1,022° F.). The catalyst disposed in the MTSC 400 can include, but is not limited to, iron oxide, chromium oxide, derivatives thereof, or any combination thereof. The MTSC 400 can be operated at a temperature of from about 250° C. (482° F.) to about 300° C. (572° F.). The catalyst disposed in the LTSC 450 can include, but is not limited to, copper, zinc, copper promoted chromia, derivatives thereof, or any combination thereof. The LTSC 450 can be operated at a temperature from about 180° C. (356° F.) to about 220° C. (428° F.).

The one or more separation systems 500 can selectively separate the syngas introduced via line 230 to provide a hydrogen product via line 510 and a waste product via line 515. In one or more embodiments, the one or more separation systems 500 can include, but are not limited to, membrane separation systems, pressure swing adsorption systems, and/or cryogenic separation systems. The membrane separation system can include, but is not limited to, one or more carbon molecular sieves, polymeric membranes, co-polymer membranes, palladium-alloy membranes, ceramic membranes, perovskite-based membranes, zeolite based membranes, molecular sieves, or any combination thereof. The pressure swing adsorption system can include, but is not limited to, one or more adsorbent materials that are selected to allow the passage of hydrogen through the pressure swing adsorption system, while impeding the passage of other gases, for example, carbon monoxide and carbon dioxide. The adsorbent materials can include, but are not limited to, activated carbon, zeolites, silica gel, selective surface flow membranes, anhydrous calcium sulfate, lithium chloride, derivatives thereof, mixtures thereof, or combinations thereof. The cryogenic separation system can separate a mixed gas stream into two or more parts. The cryogenic separation system can use one or more operation systems, including, but not limited to, compression, dehydration, separation by cryogenic distillation, and re-vaporization.

In one or more embodiments, at least a portion of the syngas can be introduced via line 230 to the one or more HTSCs 350 to provide an intermediate via line 360. In one or more embodiments, at least a portion of the intermediate via line 360 can be introduced to the one or more MTSCs 400, the one or more LTSCs 450, separation systems 500, or any combination thereof.

In one or more embodiments, at least a portion of the syngas can be introduced via line 230 to the one or more MTSCs 400 to provide an intermediate via line 410. In one or more embodiments, at least a portion of the intermediate via line 410 can be introduced to the one or more HTSCs 350, the one or more LTSCs 450, separation systems 500, or any combination thereof.

In one or more embodiments, at least a portion of the syngas via line 230 can be introduced to the one or more LTSCs 450 to provide an intermediate via line 460. In one or more embodiments, at least a portion of the intermediate via line 460 can be introduced to the one or more HTSCs 350, the one or more MTSCs 400, separation systems 500, or any combination thereof.

The syngas provided via line 360 from the HTSC 350, via line 410 from the MTSC, and/or via line 460 from the LTSC 450 can contain less carbon monoxide than the syngas introduced via line 230 and/or the other intermediates via lines 360, 410, and/or 460. The intermediates provided via line 360 from the HTSC 350, via line 410 from the MTSC 400, and/or via line 460 from the LTSC 450 can contain 5% mol or less dry basis carbon monoxide, or 3% mol or less dry basis carbon monoxide, or 2% mol dry basis or less carbon monoxide, or 1% mol or less dry basis carbon monoxide, or 0.5% mol dry basis or less dry basis carbon monoxide.

The syngas via line 230, intermediate via line 360, intermediate via line 410, and/or intermediate via line 460, can be apportioned equally or unequally to any one or more of the following. HTSCs 350, MTSCs 400, LTSCs 450, and/or separation systems 500. For example, about 75% of the syngas via line 230 can be introduced to the HTSCs 350 and 25% can be introduced to the MTSCs 400. The intermediates via lines 360 and 410 can then be introduced to the separation system 500 to provide the hydrogen product via line 510 and the waste product via line 515.

In one or more embodiments, syngas can be introduced via line 230 to the one or more HTSCs 350 to provide the intermediate via line 360. The intermediate via line 360 can be introduced to the one or more MTSCs 400 to provide an intermediate via line 410. The intermediate via line 410 can be introduced to the one or more LTSCs 450 to provide an intermediate via line 460. The intermediate via line 460 can be introduced to the one or more separation systems 500 to provide the hydrogen product via line 510 and the waste product via line 515.

The hydrogen product via line 510 can contain about 90% mol dry basis hydrogen or more, or about 95% mol dry basis hydrogen or more, or about 97% mol dry basis hydrogen or more, or about 99% mol dry basis hydrogen or more. The hydrogen product via line 510 can contain about 99.5% mol dry basis hydrogen or more, or about 99.9% mol dry basis hydrogen or more. The waste product via line 515 can include but is not limited to, carbon monoxide, carbon dioxide, oxygen, nitrogen, water, and inerts.

Figure 8:
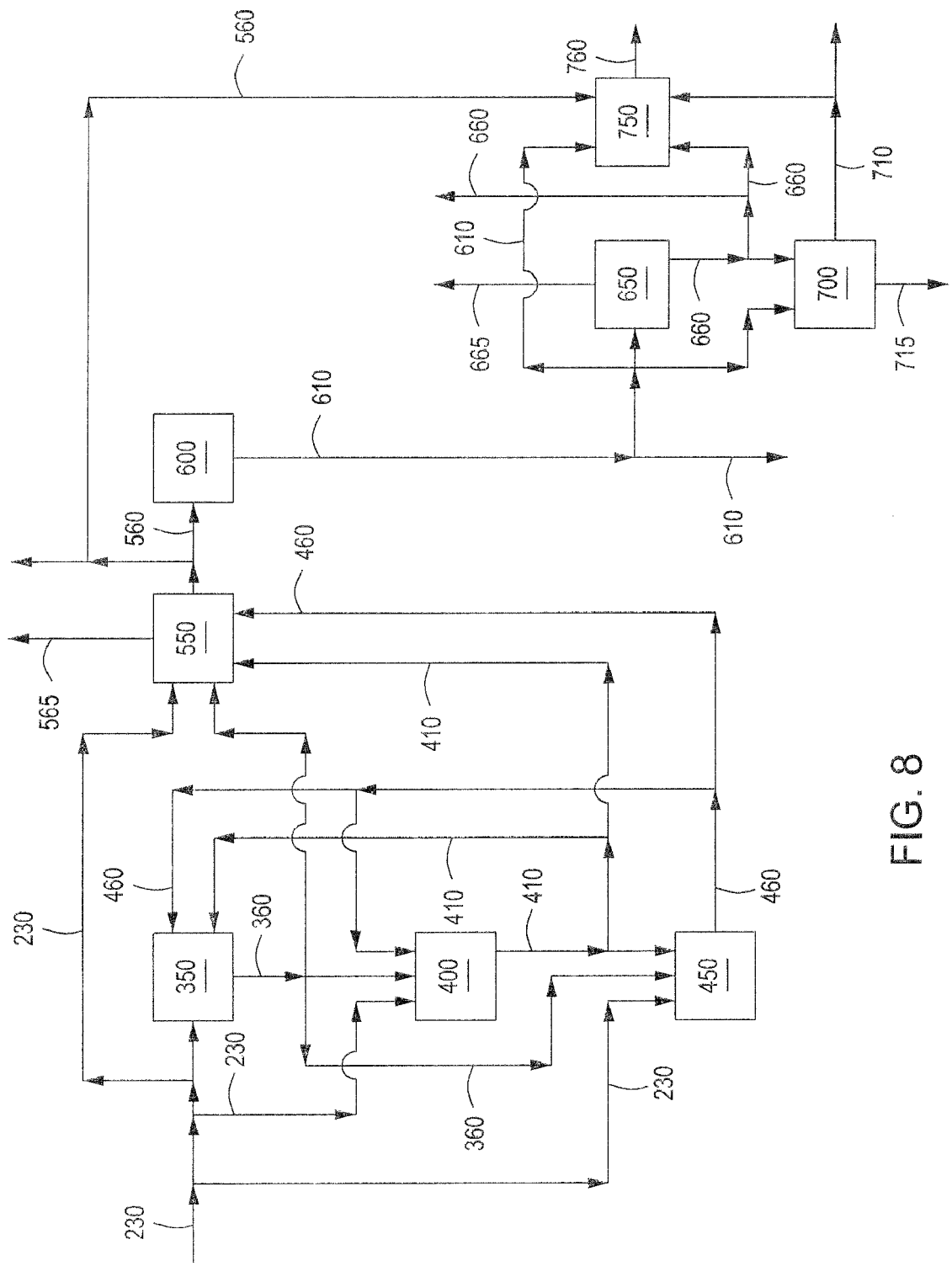
FIG. 8 depicts an illustrative system for producing syngas, hydrogen products, and ammonia, according to one or more embodiments described.

FIG. 8 depicts an illustrative system for producing syngas, hydrogen products, and ammonia, according to one or more embodiments. The syngas via line 230 can be produced using the system and processes discussed and described above with reference to FIGS. 1-6. The system can further include one or more MTSCs 350, one or more MTSCs 400, one or more LTSCs 450, which can be as discussed above in reference to FIG. 7. The system can include one or more carbon dioxide removal systems 550. The system can include one or more driers 650, cryogenic separation units 700, and/or ammonia synthesis units 750. At least a portion of the syngas via line 230 can be introduced to the one or more HTSCs 350, the one or more MTSCs 400, the one or more LTSCs 450, and/or the one or more carbon dioxide removal systems 550. Although not shown, in one or more embodiments, the syngas can be as discussed and described above with reference to FIG. 3 (i.e.

the first syngas and/or the second syngas can be independently processed downstream without mixing or mixing only a portion of each to provide the syngas via line 230).

As discussed above in reference to FIG. 7, prior to introducing at least a portion of the syngas via line 230 to the one or more separation systems 500 in FIG. 7, at least a portion of the syngas via line 230 can be apportioned equally or unequally and in any order or combination to any one or more of the one or more HTSCs 350, the one or more MTSCs 400, and/or the one or more LTSCs 450 to provide the intermediates via lines 360, 410, and/or 460, respectively, which can be introduced to the one or more carbon dioxide removal systems 550.

The one or more carbon dioxide removal systems 550 can include one or more physical separation systems including, but not limited to, membrane type systems and solvent based systems. For example, the one or more carbon dioxide removal systems 550 can include, but is not limited to, absorbtion/desorption type, solvent-based systems. The carbon dioxide removal system 550 can contact the syngas introduced via line 230 and/or intermediates introduced via lines 410, 460 and/or 510 with one or more absorbents to remove at least a portion of the carbon dioxide. Carbon dioxide selective adsorbents can include, but are not limited to, monoethanolamine ("MEA"), diethanolamine ("DEA"), triethanolamine ("TEA"), potassium carbonate, methyldiethanolamine ("MDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The one or more carbon dioxide removal systems 550 can provide a hydrogen product via line 560 and a carbon dioxide byproduct via line 565. The hydrogen product via line 560 can contain about 90% mol dry basis hydrogen or more, or about 95% mol dry basis hydrogen or more, or about 97% mol dry basis hydrogen or more, or about 99% mol dry basis hydrogen or more. The hydrogen product or carbon dioxide lean syngas via line 560 can contain about 10% mol dry basis carbon monoxide and carbon dioxide or less, or 5% mol dry basis carbon monoxide and carbon dioxide or less, or 3% mol dry basis carbon monoxide and carbon dioxide or less, or 1% mol dry basis carbon monoxide and carbon dioxide or less.

The recovered carbon dioxide via line 565 can be used in a fuel recovery process to enhance the recovery of oil and gas. In an illustrative oil recovery process, carbon dioxide can be injected and flushed into an area beneath an existing well where "stranded" oil exists. The water and carbon dioxide removed with the crude oil can then be separated and recycled.

For ammonia production and other nitrogen containing products that require nitrogen, an oxidant containing nitrogen can be introduced via line 140 to the CPOX reactor 150 (see FIG. 1). The oxidant introduced via line 140 to the first hydrocarbon in line 110 can be or include air, nitrogen-enriched air, other nitrogen containing gases or excess air. The term "excess air" as used here means that the resulting molar ratio of hydrogen to nitrogen (following shift conversion) in the syngas can be less than about 3 (the typical stoichiometric ratio for ammonia syngas make-up). As used herein, the term "nitrogen-enriched air" refers to an oxidant stream containing 79% vol or more nitrogen. Using air instead of oxygen or oxygen-enriched air can be economically beneficial where the nitrogen content and/or hydrogen purity of the syngas is not critical, for example, in fuel cells, in the hydrotreatment of crude oil or heavy fractions thereof, or in applications where the nitrogen is inert and the presence thereof does not significantly affect the economics of the process. Air can be used as a substitute for pure oxygen when economic or space considerations restrict the use of a conventional air separation unit ("ASU"), such as when a CPOX reactor 150 and reforming exchanger 200 are used for producing hydrogen for use on a floating production storage and offtake ("FPSO") facility. If desired, the air can be supplied by a compressor that can be driven by a gas turbine, and heat recovered from the gas turbine exhaust can be used, for example, to preheat process feed streams, generate process steam, or the like.

Using air or excess air as the oxidant can provide a first syngas via line 160, and syngas via line 230, which can contain, but is not limited to hydrogen, carbon monoxide, carbon dioxide, and nitrogen. The syngas via line 230 can have a nitrogen content ranging from 20% mol dry basis to about 80% mol dry basis.

At least a portion of the hydrogen product (with or without nitrogen) via line 560 can be introduced to a methanator 600. The methanator 600 can convert at least a portion of any residual carbon monoxide and carbon dioxide in the hydrogen product in line 560 to methane and water to provide a hydrogen product via line 610 which can be essentially free (i.e. less than 500 ppmw) of total carbon monoxide and carbon dioxide. The methanator 600 can be a catalytic process operating at a temperature sufficient for converting or reacting at least a portion of the carbon monoxide and carbon dioxide to methane and water. Suitable methanator catalysts can include, but are not limited to, nickel, a rare earth promoted nickel, derivatives thereof, or combinations thereof. The methanator 600 can operate at a temperature of from about 200° C. (392° F.) to about 400° C. (752° F.). The hydrogen product in line 610 can contain about 50 ppm carbon monoxide and carbon dioxide or less, or 30 ppm carbon monoxide and carbon dioxide or less, or 10 ppm carbon monoxide and carbon dioxide or less. When an oxidant containing nitrogen is used the hydrogen product via line 610 can contain about 20% mol (excluding water) to about 80% mol (excluding water) nitrogen.

At least a portion of the hydrogen product via line 610 can be introduced to a drier 650, a cryogenic separation unit 700, an ammonia synthesis unit 750, or a combination thereof. The drier 650 can remove water from the hydrogen product to provide a dried hydrogen product via line 660 and water via line 665. The drier 650 can include, but is not limited to, one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof. The hydrogen product via line 660 can contain about 90% mol dry basis hydrogen or more, or about 95% mol dry basis hydrogen or more, or about 97% mol dry basis hydrogen or more, or about 99% mol dry basis hydrogen or more.

In one or more embodiments, at least a portion of the hydrogen product via line 610, dried hydrogen product via line 660, or both can be introduced to a cryogenic separation unit 700 and/or an ammonia synthesis unit 750. The cryogenic separation unit 700 can remove contaminants such as methane and inerts to provide a purified hydrogen product via line 710. In one or more embodiments, if present in the hydrogen product in lines 610 and/or dried hydrogen product in line 660, excess nitrogen can be removed to provide a hydrogen to nitrogen (hydrogen:$N_2$) ratio of approximately 3:1 (or any other desirable ratio) in the purified hydrogen product via line 710. The contaminants, i.e., waste, removed via line 715 can contain, but are not limited to, methane, nitrogen, water, and inerts can be recovered via line 715.

The purified hydrogen product in line 710 can contain about 97% mol dry basis hydrogen or more, or about 99% mol dry basis hydrogen or more, or about 99.5% mol dry basis hydrogen or more, or about 99.9% dry basis hydrogen or more. The purified hydrogen product in line 710 (for use, for example, in ammonia synthesis), can contain nitrogen and can have a hydrogen to nitrogen ratio of about 3:1 (or any other desirable ratio).

In one or more embodiments, at least a portion of the hydrogen product via line 560, hydrogen product via line 610, dried hydrogen product via line 660, purified hydrogen product via line 710, or any combination thereof, can be supplied as an ammonia synthesis feed to the ammonia synthesis unit 750 to provide an ammonia product via line 760. However, optimal feed compositions and therefore, optimal ammonia yield can be hindered by introducing an ammonia synthesis feed containing excess nitrogen.

In one or more embodiments, the ammonia synthesis unit 750 can include any systems, devices, and/or combinations thereof suitable for converting or reacting hydrogen and nitrogen to provide ammonia. While not shown, in one or more embodiments, the ammonia synthesis unit 750 can include, but is not limited to, a reactor system that can include at least one catalytic synthesis reactor, units for cooling the product gas, units for separating the ammonia product from unreacted gases, units for reheating the reactor feed, equipment for the addition of make-up gas and if the make-up gas contains inerts equipment for removal of a purge gas, equipment for the recirculation of unreacted gas, and make-up gas to the reactor system.

The catalytic synthesis reactor can be single or multi-pass converters using a magnetite and/or platinum group metal catalyst, for example, ruthenium. In one or more embodiments, the one or more catalytic synthesis reactors can include any reactor intended to operate at elevated pressures and/or temperatures to convert or react at least a portion of a feed gas containing nitrogen and hydrogen to ammonia. Additional reaction, catalyst, and catalytic synthesis reactor details, which can be used for producing ammonia can be found in U.S. Pat. Nos. 7,081,230; 6,171,570; and 6,132,687, each of which are fully incorporated by reference herein.

Figure 9:
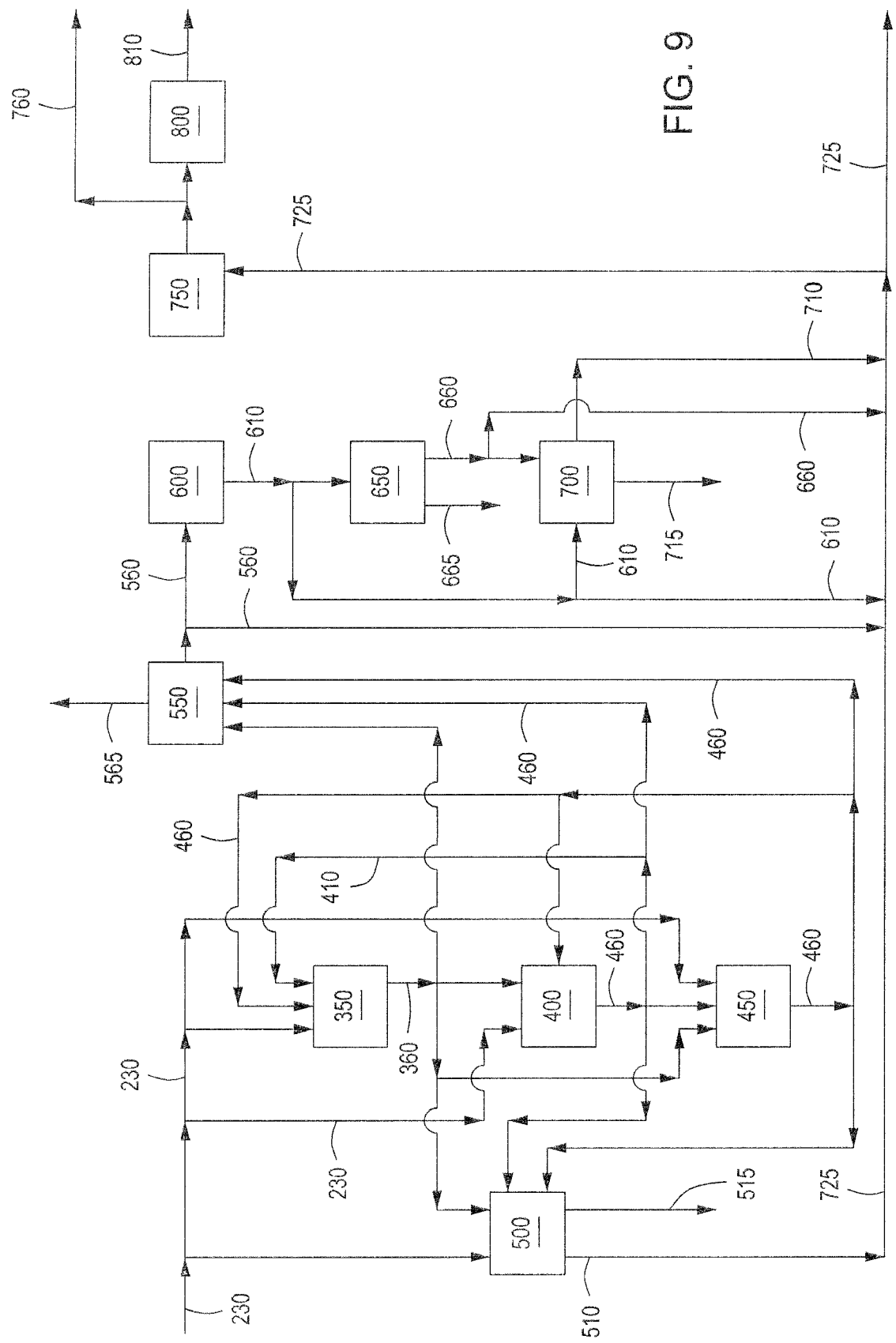
FIG. 9 depicts an illustrative system for producing syngas, ammonia, and ammonia derivatives, according to one or more embodiments described.

FIG. 9 depicts an illustrative system for producing syngas, ammonia, and ammonia derivatives, according to one or more embodiments. The syngas via line 230 can be produced using the system discussed and described above with reference to FIGS. 1-6. The one or more HTSCs 350, the one or more MTSCs 400, the one or more LTSCs 450, the one or more separation systems 500, the one or more carbon dioxide removal systems 550, the one or more methantors 600, the one or more driers 650, the one or more cryogenic separators 700, and the one or more ammonia synthesis units 750 can be as discussed and described above in reference to FIGS. 7 and 8.

In one or more embodiments, the hydrogen product via line 510, the hydrogen product via line 610, the dried hydrogen product via line 660, and/or the purified hydrogen product via line 710, depending on the intended use with or without nitrogen, can be further processed or used in various processes, for example, the production of ammonia, methanol, hydrogenation processes, and other chemicals, and for power generation, such as in fuel cells and furnaces.

In one or more embodiments, the ammonia product via line 760 can be supplied to synthesis unit 800, which can be but is not limited to, a urea synthesis unit, ammonium salt synthesis unit, ammonium phosphate synthesis unit, nitric acid synthesis unit, acrylonitrile synthesis unit, amide synthesis unit, water or waster water treatment unit, industrial refrigeration unit, or any other synthesis unit that can produce ammonia derived products.

In one or more embodiments, the urea synthesis unit 800 can react ammonia with carbon dioxide. The carbon dioxide can be introduced via line 565 (not shown) from the carbon dioxide removal unit 550 (or other source) to the urea synthesis unit 800 to provide ammonium carbamate. The ammonium carbamate can be dehydrated to provide urea via line 810. In one or more embodiments, the urea via line 810 can be used as a fertilizer or in the synthesis of other products. The urea via line 810 can be further processed to produce urea-formaldehyde resins, melamine, acylureas, urethanes, melamine-formaldehyde, and derivatives thereof.

In one or more embodiments, the ammonium salt synthesis unit can provide ammonium salts and derivatives thereof via line 810. In one or more embodiments, the ammonium salts can be, but are not limited to, ammonium chloride, ammonium nitrate, ammonium sulfate, ammonium carbamate, and derivatives thereof.

In one or more embodiments, the ammonium phosphate unit 800 can provide ammonium phosphate, diammonium hydrogen phosphate, ammonium dihydrogen phosphate, and derivatives thereof via line 810. In one or more embodiments, the nitric acid synthesis unit can provide nitric acid and derivatives thereof via line 810. In one or more embodiments, the acrylonitrile synthesis unit can provide acrylonitrile and derivatives thereof via line 810. In one or more embodiments, the amide synthesis unit can provide polyamides, for example nylon, and derivatives thereof via line 810.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing syngas, comprising:
    partially oxidizing a first hydrocarbon in the presence of an oxidant and one or more first catalysts at conditions sufficient to partially combust a portion of the first hydrocarbon to provide carbon dioxide, non-combusted first hydrocarbon, and heat;
    reforming at least a portion of the non-combusted first hydrocarbon in the presence of at least a portion of the heat generated in the partial oxidation step and the one or more first catalysts in a catalytic partial oxidation (CPOX) reactor to provide a first syngas comprising hydrogen, carbon monoxide, and carbon dioxide;

indirectly exchanging heat from the first syngas to a second hydrocarbon to reform at least a portion of the second hydrocarbon in the presence of steam and one or more second catalysts to provide a second syngas comprising hydrogen, carbon monoxide, and carbon dioxide; and reacting at least a portion of the carbon monoxide in the first syngas, the second syngas, or a mixture thereof to carbon dioxide to provide a converted syngas comprising 5% mol dry basis or less carbon monoxide, wherein the first syngas, upon exiting the CPOX reactor and prior to any further treatment or mixing, comprises from about 30% mol dry basis to about 70% mol dry basis hydrogen, from about 5% mol dry basis to about 35% mol dry basis carbon monoxide, and from about 5% mol dry basis to about 25% mol dry basis carbon dioxide.

2. The process of claim 1, further comprising cooling the first syngas by direct heat exchange, indirect heat exchange, or both with a heat transfer medium before indirectly exchanging heat from the first syngas to the second hydrocarbon in the presence of steam and the one or more second catalysts.

3. The process of claim 1, further comprising mixing at least a portion of the first syngas and at least a portion of the second syngas to provide a syngas product.

4. The process of claim 1, further comprising:
separating at least a portion of the hydrogen from the converted syngas gas to provide a hydrogen product.

5. The process of claim 4, further comprising reacting at least a portion of the hydrogen product with nitrogen in the presence of one or more third catalysts to provide an ammonia product.

6. The process of claim 5, further comprising reacting at least a portion of the ammonia product with one or more reactants to provide one or more ammonia derivatives.

7. The process of claim 1, further comprising:
separating at least a portion of the carbon dioxide from the converted syngas to provide a first hydrogen product, comprising hydrogen, carbon monoxide, and carbon dioxide;
reacting at least a portion of carbon monoxide and carbon dioxide in the first hydrogen product to provide a second hydrogen product comprising hydrogen, methane, and water; and
reacting at least a portion of the second hydrogen product with nitrogen in the presence of one or more third catalysts to provide an ammonia product.

8. The process of claim 7, further comprising reacting at least a portion of the ammonia product with one or more reactants to provide one or more ammonia derivatives.

9. The process of claim 1, further comprising:
separating at least a portion of the carbon dioxide from the converted syngas to provide a first hydrogen product, comprising hydrogen, carbon monoxide, and carbon dioxide;
reacting at least a portion of the carbon monoxide and the carbon dioxide in the first hydrogen product to provide a second hydrogen product comprising hydrogen, methane, and water;
separating at least a portion of the water from the second hydrogen product to provide a dried hydrogen product; and
reacting at least a portion of the dried hydrogen product with nitrogen in the presence of one or more third catalysts to provide an ammonia product.

10. The process of claim 9, further comprising reacting at least a portion of the ammonia product with one or more reactants to provide one or more ammonia derivatives.

11. The process of claim 1, further comprising:
separating at least a portion of the carbon dioxide from the converted syngas to provide a first hydrogen product, comprising hydrogen, carbon monoxide, and carbon dioxide;
reacting at least a portion of carbon monoxide and carbon dioxide in the first hydrogen product to provide a second hydrogen product comprising hydrogen, methane, and water;
separating at least a portion of the water from the second hydrogen product to provide a dried hydrogen product; and
purifying at least a portion of the dried hydrogen product to provide a fourth hydrogen product comprising hydrogen, wherein the purifying comprises separating at least a portion of any residual gases, wherein the residual gases comprise one or more of carbon monoxide, carbon dioxide, water, and inerts.

12. The process of claim 1, further comprising:
separating at least a portion of the carbon dioxide from the converted syngas to provide a first hydrogen product, comprising hydrogen, carbon monoxide, and carbon dioxide;
reacting at least a portion of carbon monoxide and carbon dioxide in the first hydrogen product to provide a second hydrogen product comprising hydrogen, methane, and water;
separating at least a portion of the methane and water from the second hydrogen product to provide a dried hydrogen product; and
purifying at least a portion of the dried hydrogen product to provide a purified hydrogen product comprising hydrogen and nitrogen in a molar ratio of from about 2.7 to about 3.3, wherein the purifying comprises separating at least a portion of any residual gases and excess nitrogen, wherein the residual gases comprise one or more of carbon monoxide, carbon dioxide, water, and inerts, wherein the oxidant comprises air, excess air, nitrogen enriched air, or mixtures thereof.

13. The process of claim 1, wherein the one or more first catalysts, second catalysts, or both comprise two or more catalysts.

14. The process of claim 1, wherein the first hydrocarbon and the second hydrocarbon comprise one or more $C_1$-$C_{20}$ hydrocarbons.

15. The process of claim 1, wherein the first hydrocarbon and the second hydrocarbon comprise natural gas, de-sulfurized natural gas, methane, de-sulfurized methane, or a mixture thereof.

16. The process of claim 1, wherein the first hydrocarbon and the second hydrocarbon are different.

17. The process of claim 1 further comprising mixing at least a portion of the first syngas and at least a portion of the second syngas to produce a syngas product, wherein the syngas product comprises of from about 50% mol dry basis to about 70% mol dry basis hydrogen, of from about 20% mol dry basis to about 35% mol dry basis carbon monoxide, and of from about 5% mol dry basis to about 25% mol dry basis carbon dioxide.

18. The process of claim 1, wherein the first syngas has a carbon dioxide concentration ranging from at least 5% mol dry basis to about 25% mol dry basis.

19. The process of claim 1 wherein the first syngas has a carbon dioxide concentration ranging from at least 7% mol dry basis to about 25% mol dry basis.

20. The process of claim 1, wherein indirectly exchanging the heat from the first syngas to the second hydrocarbon further comprises preventing contact between the first syngas and the second syngas; and the process further comprises recovering a first syngas product and a second syngas product.

21. A process for producing syngas, comprising:
partially oxidizing a first hydrocarbon in the presence of an oxidant and one or more first catalysts in a first reaction zone at conditions sufficient to partially combust at least a portion of the first hydrocarbon to provide carbon dioxide, non-combusted first hydrocarbon and heat;
at least partially reforming the non-combusted hydrocarbon in the first reaction zone in the presence of at least a portion of the heat generated in the partial oxidation step and the one or more first catalysts in a catalytic partial oxidation (CPOX) reactor to provide a first syngas comprising hydrogen, carbon monoxide, and carbon dioxide; and
indirectly exchanging heat from the first syngas to a second hydrocarbon in a second reaction zone to reform at least a portion of the second hydrocarbon in the presence of steam and one or more second catalysts to provide a second syngas comprising hydrogen, carbon monoxide, and carbon dioxide; and
reacting at least a portion of the carbon monoxide in the first syngas, the second syngas, or a mixture thereof to carbon dioxide to provide a converted syngas comprising 5% mol dry basis or less carbon monoxide,
wherein the first syngas, upon exiting the CPOX reactor and prior to any further treatment or mixing, comprises from about 30% mol dry basis to about 70% mol dry basis hydrogen, from about 5% mol dry basis to about 35% mol dry basis carbon monoxide, and from about 5% mol dry basis to about 25% mol dry basis carbon dioxide.

22. The process of claim 21, further comprising cooling the first syngas by direct heat exchange, indirect heat exchange, or both with a heat transfer medium before indirectly exchanging heat from the first syngas to the second hydrocarbon.

23. The process of claim 21, wherein the one or more first catalysts, second catalysts, or both comprises two or more catalysts.

24. The process of claim 21, wherein the first reaction zone, the second reaction zone, or both comprises two or more catalyst-containing beds.

25. The process of claim 21, wherein the second reaction zone comprises one or more tubes, each containing the second catalyst.

26. The process of claim 21, wherein indirectly exchanging the heat from the first syngas to the second hydrocarbon further comprises preventing contact between the first syngas and the second syngas; and the process further comprises recovering a first syngas product and a second syngas product.

* * * * *